United States Patent [19]

Reaves

[11] Patent Number: 5,377,380
[45] Date of Patent: Jan. 3, 1995

[54] SIMULATED VEHICLE HEADLIGHT WIPERS

[76] Inventor: Ronald C. Reaves, 485 Hawthorn Pl., Reynoldsburg, Ohio 43068

[21] Appl. No.: 559,145

[22] Filed: Jul. 27, 1990

[51] Int. Cl.6 .............................. B60S 1/34; B60S 1/56
[52] U.S. Cl. ...................... 15/250.002; 15/250.001; 15/250.35; 15/250.42; 472/51; 472/57; D12/219
[58] Field of Search ............... 272/8 N, 8 D; 40/538; 446/7; 15/250 A, 250 R, 250.3, 250.42, 250.35; D12/155

[56] References Cited

U.S. PATENT DOCUMENTS

| | | | |
|---|---|---|---|
| 2,031,297 | 2/1936 | Anderson | 15/250.30 |
| 2,584,777 | 2/1952 | Adolfson | D12/155 |
| 2,602,265 | 7/1952 | Jackson | 272/8 R |
| 2,665,520 | 1/1954 | Staccone et al. | 15/250.3 |
| 2,814,823 | 12/1957 | Werner | 15/250 A |
| 2,884,656 | 5/1959 | Bryant | 15/250 A |
| 2,922,253 | 1/1960 | Carter | 272/8 R |
| 2,976,039 | 3/1961 | Chouinord | 272/8 |
| 3,016,766 | 1/1962 | Hoyler | 15/250.3 |
| 3,072,947 | 1/1963 | Bryant | 15/250 A |
| 3,076,990 | 2/1963 | Depprich | 15/250 A |
| 3,132,859 | 5/1964 | Braunhut | 272/8 |
| 3,448,480 | 6/1969 | Couget | 15/250.3 |
| 3,493,804 | 3/1970 | Fennell | 15/250 A |
| 3,562,398 | 2/1971 | Benjamin | 2762/8 R |
| 3,608,123 | 9/1971 | Champigny | 15/250 A |
| 3,736,617 | 6/1973 | Ahlen | 15/250 A |
| 3,772,729 | 11/1973 | Evard | 15/250 A |
| 3,893,203 | 7/1975 | Berkelius | 15/250 A |
| 4,280,695 | 7/1981 | Stenehjem et al. | 272/8 N |
| 4,316,303 | 2/1982 | Penn | 15/250.3 |
| 4,358,488 | 11/1982 | Dunklin et al. | 428/31 |
| 4,431,195 | 2/1984 | Brand et al. | 273/256 |
| 4,505,001 | 3/1985 | Fasolino | 15/250 A |
| 4,765,017 | 8/1988 | Berger et al. | 15/250 A |
| 4,824,097 | 4/1989 | Antrel | 272/8 N |
| 4,857,031 | 8/1989 | Lucas | 446/481 |
| 4,909,501 | 3/1990 | Hoffman | 272/8 M |
| 4,921,459 | 5/1990 | Cook et al. | 446/321 |
| 4,941,859 | 7/1990 | Zaruba | 446/476 |
| 4,973,285 | 11/1990 | Diotte | 446/142 |
| 4,989,862 | 2/1991 | Curtis | 273/1.5 A |
| 5,006,089 | 4/1991 | Lee | 446/267 |

FOREIGN PATENT DOCUMENTS

| | | | |
|---|---|---|---|
| 662077 | 4/1963 | Canada | 15/250 A |
| 2335319 | 1/1974 | Germany | 15/250 A |

Primary Examiner—David A. Scherbel
Assistant Examiner—Gary K. Graham
Attorney, Agent, or Firm—Watkins, Dunbar & Pollick

[57] ABSTRACT

This invention is a simulated headlight wiper and is used as a novelty or amusement device. The wiper may be detachably mounted to the vehicle or, in another embodiment, it may be attached directly to the headlight by suitable means such as a double-sided adhesive tape. For additional realism, a simulated control block and fluid dispensing tube can be added as well as simulated wiper components such as a wiper arm, head, wiper blade holder and wiper blade.

13 Claims, 2 Drawing Sheets

SIMULATED VEHICLE HEADLIGHT WIPERS

BACKGROUND OF THE INVENTION

1. Field of the Invention

This invention relates to novelty or amusements devices and more particularly, it relates to a simulated vehicle headlight wiper.

2. Description of the Prior Art

In the amusement field, there are countless devices that simulate the actual articles of manufacture. For example, U.S. Pat. No. 2,602,265 to Jackson discloses a simulated camera, U.S. Pat. No. 2,922,253 to Carter shows a simulated bee and flower pot and U.S. Pat. No. 3,562,398 to Benjamin reveals a simulated player piano. Actual headlight cleaning devices are known, for example, U.S. Pat. No. 4,765,017 to Berger and U.S. Pat. No. 4,505,001 to Fasolino. However, until the present invention there has been no simulated headlight wiper.

SUMMARY OF THE INVENTION

This invention provides a novelty device that simulates a vehicle headlight wiper. It consists of a simulated headlight wiper and a means for attaching the simulated wiper to a vehicle headlight. The simulation can be simple or complex. In its simplest form, the simulated wiper consists of a single oblong member. This member is attached to the vehicle headlight by suitable means such as a velcro fastener or two-sided adhesive tape.

In a more complex simulation, the wiper consists of, among other things, a wiper head, a wiper blade holder, a wiper blade and a wiper arm. In addition, the wiper head can be formed from two or more interconnected and moveable segments. The complexity of the various components will depend on the degree of simulation that is desired.

This invention can further comprise a simulated control block such as might be used for the delivery of washer fluid through the wiper head. The control block is attached to the vehicle by suitable means such as velcro strips or a two-sided adhesive tape. A connection between the simulated control block and the simulated wiper is simulated by a round piece of tubing, string, or other connection-simulating material. The control block is attached to the vehicle with a double-sided adhesive tape.

In another embodiment of this invention the simulated headlight wiper is attached to the vehicle rather than to the headlight using suitable means. The simulated headlight wiper consists of a simulated wiper arm, wiper head, wiper blade holder, and wiper blade, all interconnected in a fashion so as to simulate a conventional wiper assembly.

The simulated wiper can be attached to the vehicle by means of a mounting member with a spherically ending projection that cooperates with one or more sockets in a detachable mounting block, i.e., a ball and socket joint. The projecting sphere and socket are of such size so as to enable ready attachment or detachment of the block from the mounting member. The mounting and demounting assembly allows the user to detach the wiper blade and thereby prevent its theft when it is desirable not to leave the wiper blade on the headlight or for cleaning purposes. The mounting member is attached to the vehicle with suitable means such as, for example, a double-sided adhesive tape or Velcro. By placing several cooperating sockets in the detachable mounting block, it is possible to affix the mounting member in various positions on the vehicle as, for example, on a horizontal part of a bumper or on a vertical surface adjacent to the vehicle headlight. Typically, the simulated wiper is attached to the mounting block by suitable means such as a screw or bolt or other type fastener.

The foregoing and other advantages of the invention will become apparent from the following disclosure in which one or more preferred embodiments of the invention are described in detail and illustrated in the accompanying drawings. It is contemplated that variations in procedures, structural features and arrangement of parts may appear to a person skilled in the art without departing from the scope of or sacrificing any of the advantages of the invention.

Figure 1:
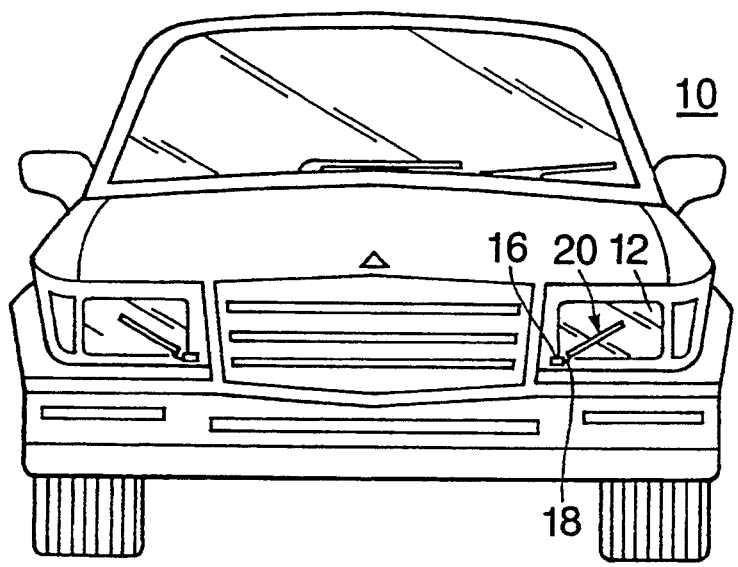
FIG. 1 is a front view of an automobile showing an embodiment of this invention as it is applied to the headlights of such a vehicle.

In describing the preferred embodiment of the invention which is illustrated in the drawings, specific terminology is resorted to for the sake of clarity. However, it is not intended that the invention be limited to the specific terms so selected and it is to be understood that each specific term includes all technical equivalents that operate in a similar manner to accomplish a similar purpose.

Although a preferred embodiment of the invention has been herein described, it is understood that various changes and modifications in the illustrated and described structure can be affected without departure from the basic principles that underlie the invention. Changes and modifications of this type are therefore deemed to be circumscribed by the spirit and scope of the invention, except as the same may be necessarily modified by the appended claims or reasonable equivalence thereof.

DETAILED DESCRIPTION OF THE INVENTION AND BEST MODE FOR CARRYING OUT THE PREFERRED EMBODIMENT

As shown in FIG. 1, this invention is a simulated headlight wiper that simulates actual wipers found on some vehicles. In its basic form, this invention consists of a simulated wiper 20 that is attached to the headlight 12 of an automobile 10. In a further refinement, the wiper 20 can be made to appear to be connected to a simulated control block by means of a simulated connector such as a piece of rubber tubing, string, cord, etc.

In its simplest form, the simulated wiper 20 can be a rectangular or oblong piece of plastic. The simulated connector 18 can be attached to the wiper 20 by passing one end through an aperture or slit and knotting it on the other side and then passing the other end through an aperture or slit in the control block 16 and tying it at its end so that the simulated connector 18 does not separate from the wiper 20 or the control block 16.

Figure 2:
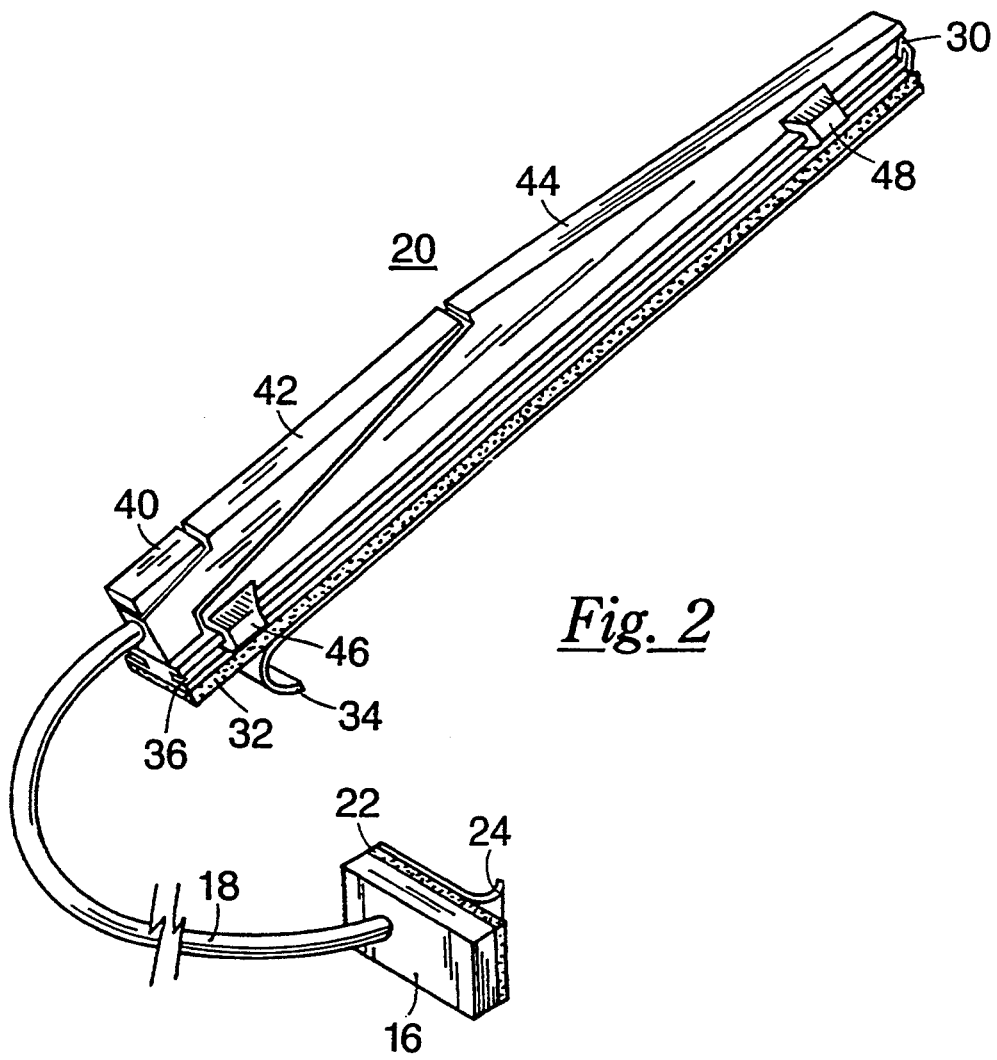
FIG. 2 is a perspective view of the invention.

FIG. 2 illustrates a more detailed simulation of the wiper. As shown in FIG. 2, the wiper 20 consists of a wiper head that is formed of three interlocking and movable wiper head segments 40, 42, and 44. The segments are interlocked by means of mating apertures and pivot posts in the corresponding parts.

The wiper 20 may further consist of a wiper blade holder 30 that is suitably attached to the wiper head component 44. The wiper blade holder 30 may be rigidly secured to the wiper head 44 or, in a more realistic simulation, wiper head 30 may have a groove 36 into which wiper head segment tabs 46 and 48 slide. For the embodiment shown in FIG. 2, no simulation of an actual wiper blade is used; rather a double-sided piece of tape 32 is attached directly to the wiper blade holder 30. A protective backing 34 is applied to the other side of the double-sided adhesive tape 32 and is removed prior to the installation of the wiper 20 on headlight 12, To add further effect to this invention, a simulated control box 16 is applied to the surface of the vehicle 10 in the area of wiper 20. In its basic form, control block 16 is simply a block to which is attached a piece of double-sided adhesive tape 22 with a suitable protective backing 24. At the time of application, the backing 24 is removed and the control block 16 attached to the surface of the automobile in the area of the headlight 12.

For additional effect, a simulated wiper fluid tube or connector 18 can be attached to the wiper 20 and the control block 16 by suitable means. For example, the tube can be simulated by a piece of cord and the cord passed through an aperture or slit in wiper 20 and knotted at its end and the second end passed through a slit or hole in control block 16 and knotted at the second end.

Figure 3:
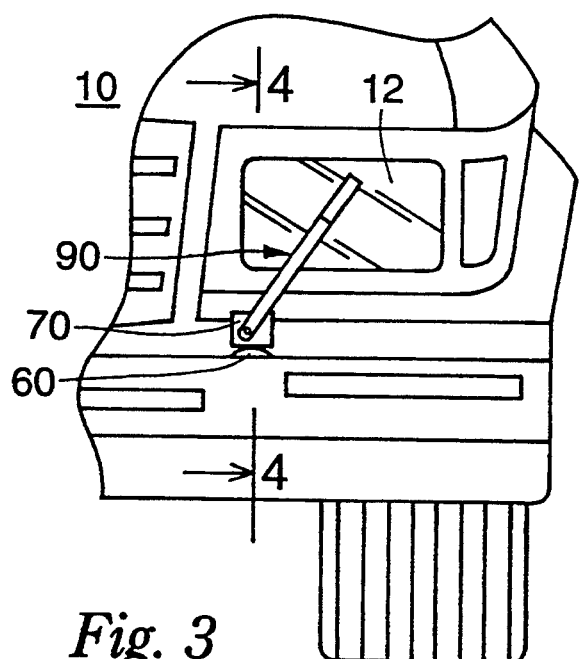
FIG. 3 is another embodiment of this invention used in cooperation with the bumper of a vehicle.

FIG. 3 illustrates another embodiment of this invention in which a wiper 90 is attached to the vehicle 10 by suitable means in the vicinity of the headlight 12. The embodiment shown in FIG. 3 consists of the wiper 90, a mounting member 60, and a detachable mounting block 70.

Figure 4:
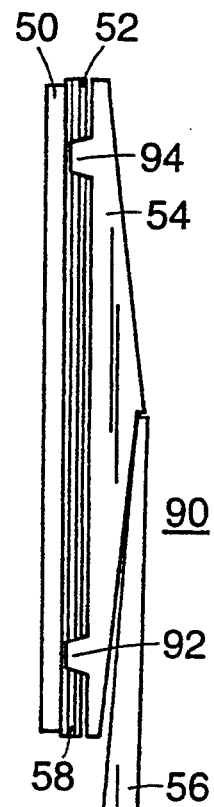
FIG. 4 is a detailed view of a second embodiment of this invention.
Figure 4:
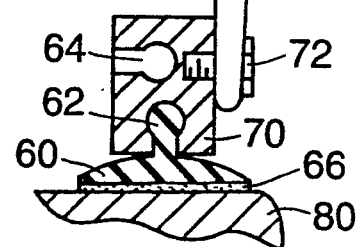

As shown in FIG. 4, the mounting member 60 has a projecting spherical end 62 that cooperates with one or more sockets 64 in the mounting block 70. By using the ball and socket means for connecting the wiper 90 to the vehicle, the wiper 90 can be readily attached and detached from the vehicle to prevent theft or to otherwise remove the wiper 90 from the vehicle. The mounting member 60 is attached to the automobile by means of a double-sided adhesive tape 66. By placing two or more sockets 64 in the mounting block 70, it is possible to apply the mounting member 60 to various surfaces of the automobile. For example, as shown in FIGS. 3 and 4, the mounting member 60 has been applied to a horizontal surface of the bumper 80. The mounting member 60 could have just as easily been applied to a vertical surface of the vehicle 10 in the area of the headlight and one of the other sockets 64 used to attached the wiper 90 to the mounting member 60. As shown, the wiper arm 56 is attached to the mounting block 70 by means of a suitable fastener such as a bolt 72.

As shown in FIG. 4, the wiper 90 of this embodiment consists of a wiper arm 56, a wiper head 54, a wiper blade holder 52, and a wiper blade 50. For added effect, the wiper arm 56 may be pivotally attached to the wiper head 54 and the wiper blade holder 52 can be movably attached by means of a slot 58 which cooperates with projecting tabs 92 and 94 on wiper head 54 in a manner that is well known in the art.

It is possible that changes in configurations to other than those shown could be used but that which is shown is preferred and typical. Without departing from the spirit of this invention, various means of fastening the components together may be used.

It is therefore understood that although the present invention has been specifically disclosed with the preferred embodiment and examples, modifications to the design concerning sizing and shape may be apparent to those skilled in the art and such modifications and variations are considered to be within the scope of the invention and the appended claims.

What is claimed is:

1. A novelty device simulating a vehicle headlight wiper comprising an oblong member that simulates a headlight wiper and means for attaching said oblong member to a vehicle headlight so as to maintain it in a stationary position relative to said headlight.

2. The novelty device according to claim 1 wherein said means for attaching said oblong member to said vehicle headlight is a piece of double-sided tape with one side contacting said oblong member and a second side contacting said vehicle headlight.

3. The novelty device according to claim 1 with said oblong member comprising a wiper head and a wiper blade holder attached to said wiper head.

4. The novelty device according to claim 3 with said wiper blade holder being movably attached to said wiper head.

5. The novelty device according to claim 3 with said wiper head comprising two or more interconnected moveable segments.

6. The novelty device according to claim 1 further comprising a block that simulates a control block, means for simulating a connection between said block and said oblong member, and means for attaching said block to a motor vehicle.

7. The novelty device according to claim 6 wherein said means for attaching said block to said vehicle is a double-sided adhesive tape with one side attached to said block and a second side attached to said motor vehicle.

8. The novelty device according to claim 6 wherein said means for simulating a connection between said block and said oblong member is a piece of round tubing.

9. A novelty device simulating a vehicle headlight wiper comprising a an oblong member that simulates a headlight wiper and means for attaching said oblong member to a vehicle so as to maintain it in a stationary position relative to a vehicle headlight.

10. The novelty device according to claim 9 with said oblong member comprising a simulated wiper arm, a simulated wiper head attached to said wiper arm, a simulated wiper blade holder attached to said wiper head and a simulated wiper blade attached to said wiper blade holder.

11. The novelty device according to claim 9 with said means for attaching said oblong member to said vehicle comprising:
   a. a vehicle mounting member with a spherical projection;
   b. a detachable mounting block with one or more sockets cooperating with said spherical projection of said vehicle mounting member;
   c. means for attaching said oblong member to said detachable mounting block; and
   d. means for attaching said mounting member to said vehicle.

12. The novelty device according to claim 11 wherein said means for attaching said mounting member to said vehicle is a double-sided adhesive tape with one side attached to said mounting member and a second side attached to said vehicle.

13. The novelty device according to claim 11 wherein said means for attaching said oblong member to said detachable mounting block is a bolt.

* * * * *